UNITED STATES PATENT OFFICE.

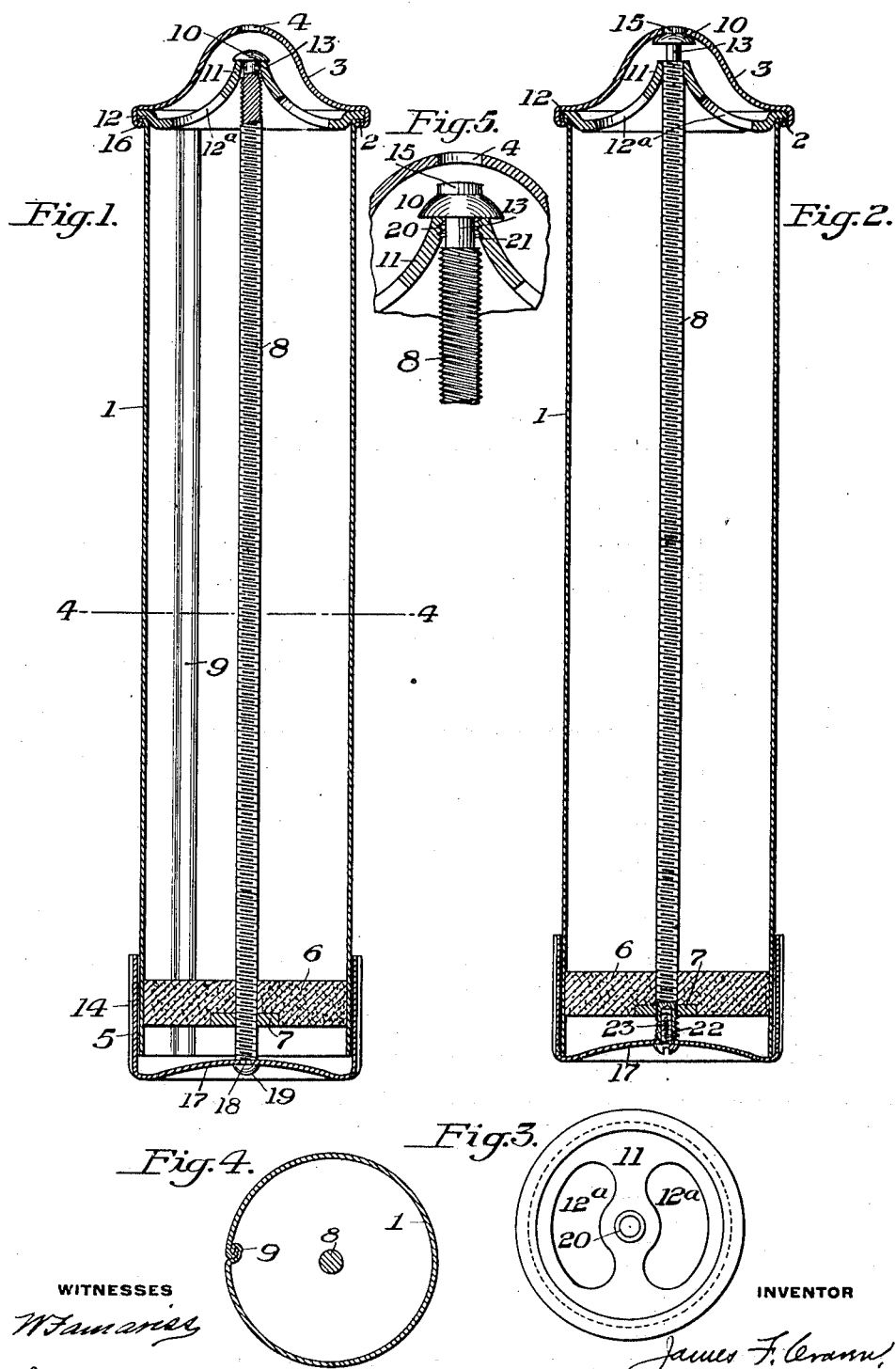

JAMES F. CRAVEN, OF PITTSBURGH, PENNSYLVANIA, ASSIGNOR TO CRAVEN ENGINEERING COMPANY, OF PITTSBURGH, PENNSYLVANIA, A CORPORATION OF PENNSYLVANIA.

RECEPTACLE FOR CONTAINING AND DISCHARGING SEMISOLID AND PASTY SUBSTANCES.

1,053,712.  Specification of Letters Patent. Patented Feb. 18, 1913.

Application filed April 22, 1912. Serial No. 692,239.

*To all whom it may concern:*

Be it known that I, JAMES F. CRAVEN, a resident of Pittsburgh, in the county of Allegheny and State of Pennsylvania, have invented a new and useful Improvement in Receptacles for Containing and Discharging Semisolid and Pasty Substances, of which the following is a specification.

This invention relates to receptacles for containing, storing, transporting and discharging semi-solid and pasty substances, such as greases or lubricants, vaseline, cold cream, butter, lard, printers' or other inks, paints and like substances, and delivering the same from the container in any desired quantity or quantities.

The invention is an improvement upon that shown, described and claimed in my Patent No. 993,511 granted May 30th, 1911, for a device of the character described.

The particular object of the present invention is to provide an improved construction in such a device for discharging the contents from the receptacle and which may be operated to close the outlet orifice when the operation of discharging the contents ceases.

The invention comprises the construction and arrangement of parts hereinafter described and claimed.

In the accompanying drawings, Figure 1 is a longitudinal section through a device embodying the invention, with the discharge orifice open; Fig. 2 is a similar view showing modifications, and illustrating the discharge orifice closed; Fig. 3 is a detail plan view illustrating a threaded member; Fig. 4 is a cross section on the line 4—4, Fig. 1; and Fig. 5 is an enlarged detail view of the device shown in Fig. 2 with the discharge orifice open.

The receptacle or container itself may be of any desired shape or size and built up or constructed from any desired material. It may be made of glass, paper or paste board but is shown as formed of a substantially cylindrical tube 1 of thin sheet metal. One end of the tube is headed outwardly, as at 2, for a purpose to be described, and the other end is straight or smooth, as shown. The beaded end of the receptacle is closed by means of a thin sheet metal head or cap 3 provided with a discharge orifice 4, and may be removable to permit filling the receptacle, but is shown as crimped around the bead 2 on the end of the tube. The other end of the receptacle is closed by means of a cup shaped sleeve or head 5.

In order to force the semi-solid or pasty substance out of the receptacle, there is provided a piston or follower 6 which may be formed of wood, metal or like material and is shown formed as a solid body of cork having a square or otherwise suitably shaped nut 7 seated in a socket therein and provided with a threaded bore. The piston or follower 6 is adapted to be moved longitudinally in the tubular receptacle and when so moved forces the material out through the discharge orifice 4. Any suitable means for moving the piston may be employed, that shown comprising a threaded rod or screw 8 arranged centrally in the receptacle and extending from end to end thereof and through a threaded bore in the piston 6. The threaded rod or shaft 8, the threads of which are preferably double and left handed, is secured to the end closure or sleeve 5, which forms a handle member for rotating the rod or shaft when desired. Suitable means is provided for preventing rotation of the piston or follower 6 as it moves endwise through the container, as, for example, a longitudinal rib 9 on the inner face of the tube 1 which engages a groove in the piston. In the case of the sheet metal tube shown, the usual crimped seam of the tube forms a sufficient rib for this purpose, as illustrated. In some cases the rib 9 may be entirely omitted and the interior surface of the tube left perfectly smooth, as when the device is made of glass, in which case the follower is formed to fit the interior wall of the tube sufficiently close and tight so that the friction between the follower and tube, supplementing the resistance to rotation offered by the contents of the receptacle, will prevent rotation of the follower. Consequently, upon rotation of the end cap or closure 5, the threaded rod or shaft 8 rotates therewith and moves the piston longitudinally through the container to discharge its contents therefrom.

At its forward end, the rod or shaft 8 is provided with an enlargement or head 10 formed by suitably upsetting the material of the end of the rod or shaft. This may be accomplished by a simple spinning operation. The enlargement or head 10 is in line with the discharge orifice 4 and is arranged to close the same by operation of the rod or shaft.

At the discharge end of the receptacle is mounted a circular threaded member 11, shown in detail in Fig. 3, and provided with one or more apertures 12$^a$ through which the contents of the receptacle pass to the discharge orifice 4, and with a central opening 13 for the threaded rod or shaft 8. Member 11 is formed of sheet metal and preferably is slightly thicker than the end cap 3, and at its central portion is bent to form a nut provided with threads 20 fitting the threaded rod or shaft 8. Preferably, and as shown, the threads are formed in the inner surface of the member, which at its center is somewhat conical, so that the threads gradually disappear, as at 21, Fig. 5, on the side of the member away from the discharge orifice. Preferably about two full threads are formed in the member 11. The member 11 is slightly cupped outwardly, as shown, and its periphery is beaded or otherwise shaped to form a flange 12, which rests upon the bead 2 at the end of the receptacle 1. Adjacent to the enlargement or head 10 on the end of the rod or shaft, the threads thereof are stripped from the rod or shaft to provide a short, smooth, cylindrical portion 13. This portion of the shaft is preferably of very slightly greater length than the length of the threaded portion of the member 11.

The rod or shaft 8 is made of such length and the end closure or cap 5 is so formed and attached thereto that when the head 10 of the rod or shaft engages the cap 3 and closes the orifice 4, only a very slight space, if any, intervenes between the cap 5 and the end of the tube 1.

When the receptacle is filled, the piston 6 lies against cap 5 and the head 10 on the screw rod 8 is in contact with the cap 3 and closes the orifice 4, the parts being in the position shown in Fig. 1. To discharge the contents, the rod or shaft 8 is rotated by turning the cap 5, the periphery of which is knurled, as at 14, thereby causing the piston 6 to travel toward the discharge end of the tube. The rotation of the rod 8 in the proper direction to cause the forward travel of the piston has the effect of unscrewing the threaded rod or shaft 8 from the member 11, until the threads on the rod or shaft have been withdrawn therefrom, and the smooth, reduced, unthreaded portion 13 of the rod or shaft brought within the threads 20 in the member 11. In this position of the parts, the head or enlargement 10 rests against the forward end of the member, as shown in Fig. 5. Further rotation of the end cap in the proper direction continues to discharge the contents of the receptacle from its discharge orifice as desired. When a sufficient portion of the contents of the receptacle has been discharged, the end cap 5 is rotated in the reverse direction. This causes the threads at the end of the rod or shaft 8 to engage the threads 20 of the nut 11, the incomplete threads 21 assisting this engagement, when rotation of the cap moves the rod or shaft 8 forwardly until the enlargement 10 closes the discharge orifice 4.

In most cases, the form of head illustrated in Fig. 1 will serve all purposes, as the device is primarily intended to be cheaply constructed and to contain comparatively inexpensive products. Under some circumstances, however, the receptacle may be used to contain either expensive products, of which none should be wasted, or products which harden if exposed to the air, as, printers' inks. For such devices, I prefer to employ the form of head or enlargement shown in Fig. 2, and which is provided with a knob or protuberance 15 to fit the opening or discharge orifice 4. The operation of this form of the device is the same as that shown in Fig. 1. When the end cap 5 is first rotated in the proper direction, it withdraws the knob or protuberance 15 from the orifice 4 and opens the same to permit discharge of the contents from the receptacle. When the end cap is rotated in the reverse direction, the enlargement or head 10 moves forwardly as before and the knob or protuberance 15 is moved into and fills the discharge orifice 4, its outer surface being formed to be flush with the outer surface of the end cap 3. This device consequently presents an attractive appearance from the outside. The operation of closing the orifice 4 always clears it of any of the contents of the receptacle which might be contained therein, if the protuberance 15 were omitted. This prevents the liability of printers' ink or like substances contained in the receptacle from hardening and closing the discharge orifice.

In the use of the device, the grease, cosmetics, ink, or other material is filled into the receptacle at the factory and the receptacle is then closed, and can be packed, shipped and stored in a practically sealed condition. The filling is done before the cap 5 is placed in position. This is accomplished in the following manner: The member 11 is placed on the rod or shaft 8 and the head or enlargement 10 is then spun or otherwise upset on the rod or shaft by the use of any suitable tool or machine. The member 11 is then placed in position with its flange 12 over the bead 2 on the tube 1, after which the end cap or closure 3 is placed over the end of the tube and its periphery beaded, crimped or bent around the bead 2 on the end of the tube 1, as at 16. The bead 16 is then squeezed or pressed together to secure the cap to the tube and pinch the flange 12 of the member 11 in the joint, thus forming a tight connection between these three members. The tube is then filled with the grease, cosmetic, ink or other substance which it is intended to contain and the piston 6 is screwed onto the rod or shaft 8. The end cap 5 is then placed in position over the end of the tube and secured to the rod or shaft 8.

The end cap 5 may be formed in any preferred manner and secured to the rod or shaft 8 as desired. Fig. 1 illustrates the end cap 5 as formed with a slight central depression 17 and with a central aperture through which a reduced end portion 18 of the rod or shaft 8 projects. The reduced end 18 of the rod or shaft is headed or spun over, as at 19, to form a head contained within the depression 17 and rigidly securing the end cap 5 to rotate with the rod or shaft. The head 19 may be formed in the same manner and by the same operations as the head 10.

It will be observed that with the form of the device described, the receptacle is non-refillable. In other words, after having once been filled, it cannot be refilled without deforming or destroying the receptacle. Under some circumstances it is desirable to close the receptacle in a manner to permit of its being refilled as, for example, in receptacles made for gift purposes and of expensive material which, if desired, may be of sheet metal plated with silver, gold or the like. In this case, the rod or shaft 8 is formed with a threaded bore 22 on its end and the cap 5, as illustrated in Fig. 2, is secured to the end cap 5 by means of a screw 23 threaded through the end cap and to the bore 22. With this form of the invention, when the receptacle is emptied, the piston may be returned to its original position and the cap 5 removed. The piston is then removed from the rod or shaft 8. The receptacle may then be again filled, the piston again screwed on the rod or shaft, and the cap 5 screwed to the rod or shaft with the screw 23, as before described.

What I claim is:—

1. A device of the character described comprising a receptacle provided at one end with a discharge orifice, a piston for exerting pressure on the substance in said receptacle, a threaded rod for actuating said piston having its end arranged to close the discharge orifice, and a stationary threaded member supported at the discharge end of the receptacle and in which said rod works and provided with openings therethrough for the passage of the substance, said rod having a smooth portion adjacent to said threaded member to arrest endwise movement of the rod while permitting rotary movement thereof.

2. A device of the character described comprising a receptacle provided at one end with an end closure having a discharge orifice, a piston for exerting pressure on the substance in said receptacle, a threaded rod for actuating said piston having its end arranged to close the discharge orifice, and a stationary threaded member at the discharge end of the receptacle and having its periphery included within the joint between the end closure and receptacle, said rod having its threads cut away adjacent to said threaded member to arrest endwise movement of the rod while permitting rotary movement thereof.

3. A device of the character described comprising a receptacle provided at one end with an end closure having a discharge orifice, a piston for exerting pressure on the substance in said receptacle, a threaded rod for actuating said piston, a threaded member supported at the discharge end of the receptacle and spaced from the end closure and provided with apertures for the passage of the substance therethrough, said rod being provided with a smooth unthreaded portion between its end and said member when the discharge orifice is closed.

4. A device of the character described comprising a receptacle provided with an end closure having a discharge orifice, a piston for exerting pressure on the substance in said receptacle, a threaded rod for actuating said piston provided with an enlargement at its end to close said orifice, and a stationary threaded member in which said rod works, said rod having its threads cut away adjacent to said member, and said enlargement being arranged to engage said member to arrest endwise movement of the rod.

5. A device of the character described comprising a receptacle provided with an end closure having a discharge orifice, a piston for exerting pressure on the substance in said receptacle, a threaded rod for actuating said piston provided with an enlargement at its end arranged to close the discharge orifice, a threaded member spaced from said end closure and having apertures for the passage of the substance therethrough, said rod having its threads cut away adjacent to said enlargement, and said enlargement being arranged to engage said member to arrest endwise movement of the rod.

6. A device of the character described comprising a receptacle provided at one end with a discharge orifice, a piston for exerting pressure on the substance in said receptacle, a threaded rod for actuating said piston having its end arranged to close said orifice, a stationary threaded member in which said rod works and provided with openings for the passage of the substance therethrough, a cup-shaped end closure at the other end of the receptacle for rotating said rod, said rod being provided with means arranged to engage said fixed member to limit endwise movement of the rod in one direction, and said cup-shaped end closure being arranged to engage the end of the receptacle and limit endwise movement of the rod in the other direction.

7. A device of the character described comprising a receptacle provided at one end with a discharge orifice, a piston for exerting pressure on the substance in said receptacle, a threaded rod for actuating said piston having a head arranged to close the discharge orifice, a stationary threaded member at the discharge end of the receptacle, said rod having its threads cut away adjacent to said member, an end closure at the other end of the receptacle arranged to rotate said rod and to engage the receptacle to limit endwise movement of the rod in one direction, and said head being arranged to engage the threaded member for limiting endwise movement of the rod in the other direction.

8. A device of the character described comprising a receptacle provided at one end with a discharge orifice, a piston for exerting pressure on the substance in said receptacle, a threaded rod for actuating said piston having a head at one end, a stationary threaded member in which said rod works, said rod having its threads cut away adjacent to said threaded member, and said head being arranged to engage said member for arresting endwise movement of the rod and being provided with a protuberance to enter and close the discharge orifice.

In testimony whereof, I have hereunto set my hand.

JAMES F. CRAVEN.

Witnesses:
 ELBERT L. HYDER,
 WILLIAM B. WHARTON.